April 7, 1959

D. A. COSTELLO 2,880,957

WEIGHING DEVICE

Filed Feb. 16, 1954

Inventor.
Don A. Costello.

By. Soans Glaister & Anderson
Attorneys.

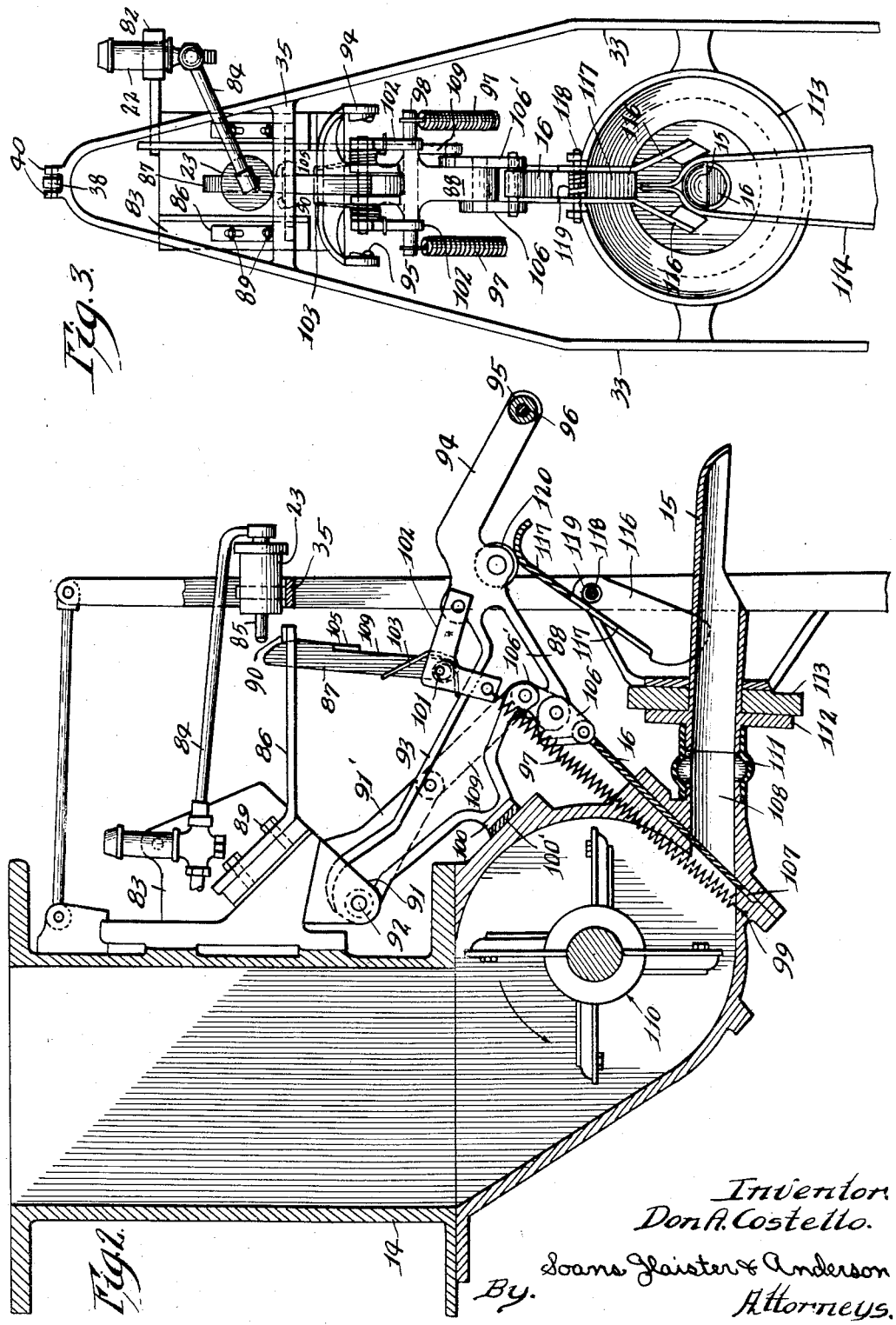

April 7, 1959  D. A. COSTELLO  2,880,957
WEIGHING DEVICE

Filed Feb. 16, 1954  3 Sheets-Sheet 3

Inventor.
Don A. Costello.
By Soans Glaister & Anderson
Attorneys.

United States Patent Office 2,880,957
Patented Apr. 7, 1959

2,880,957

WEIGHING DEVICE

Don A. Costello, Ottawa, Ill., assignor to Ottawa Silica Company, Ottawa, Ill., a corporation of Delaware Application February 16, 1954, Serial No. 410,598

4 Claims. (Cl. 249—60)

The present application relates generally to weighing devices and more particularly to weighing devices which are adapted for delivering predetermined quantities of material into suitable containers.

A large number of weighing devices have been developed for batch weighing and delivering, that is, for weighing out and delivering predetermined quantities of material into suitable containers. Most of these devices operate on the principle of rapidly closing or triggering a spring-loaded valve or gate at the bottom of a supply hopper when a predetermined weight is delivered to a suitable container on one side of a weight measuring scale. More specifically, such devices usually include a feed hopper having a gate at its lower or delivery end, a scale, ordinarily of the beam balance type, upon which a container for receiving the material which flows through the gate may be placed, and suitable triggering means which is actuated by the beam balance for closing the supply gate after a predetermined amount of material has been received in the container. Suitable means are also provided for opening the gate and resetting the triggering mechanism after the filled container has been removed from the scale and an empty container has been suitably placed on the scale in a position to receive a new batch of material from the supply hopper.

Such weighing devices as have heretofore been made have not been capable of repetitively delivering a given, predetermined weight of material with any degree of accuracy. The variation in the weight per batch which is delivered from such weighing devices arises from numerous causes. Frictional drag in the moving parts of the gate triggering mechanism generally causes the weight per batch delivered to vary by as much as 5 to 10 percent of the pre-set or required amount. Constant operation of the weighing device causes various of the moving parts of the triggering mechanism to wear away which in turn produces a change in the weight of material delivered during each cycle of the weighing device. In addition, if the material being weighed is in the form of fine particles, a sufficient amount of such fine particles will become air-borne during the operation of the weighing device to permeate and coat the triggering mechanism, causing failure of electrical contacts, increasing the frictional drag, and increasing the wearing away of the moving parts of the system.

The main objects of the present invention are to provide a weighing device which is capable of repetitively delivering, with extreme accuracy, a predetermined weight of material from a supply hopper; to provide a weighing device for repetitively delivering a predetermined weight of material which can be varied by an operator over wide limits; to provide a weighing device for repetitively delivering a predetermined quantity of material from a supply hopper wherein the weight of material delivered will remain constant over a long period of time and under extremely adverse conditions;

and to provide such a weighing device which is of a simple, rugged, and economical construction.

An illustrative embodiment of this invention is shown in the accompanying drawings, wherein:

Figure 2 is an enlarged view, partly in section, of a portion of the weighing device shown in Figure 1, the gate triggering mechanism being shown in closed position;

Figure 3 is a front elevational view of that portion of the weighing device illustrated in Figure 2;

Figure 1:
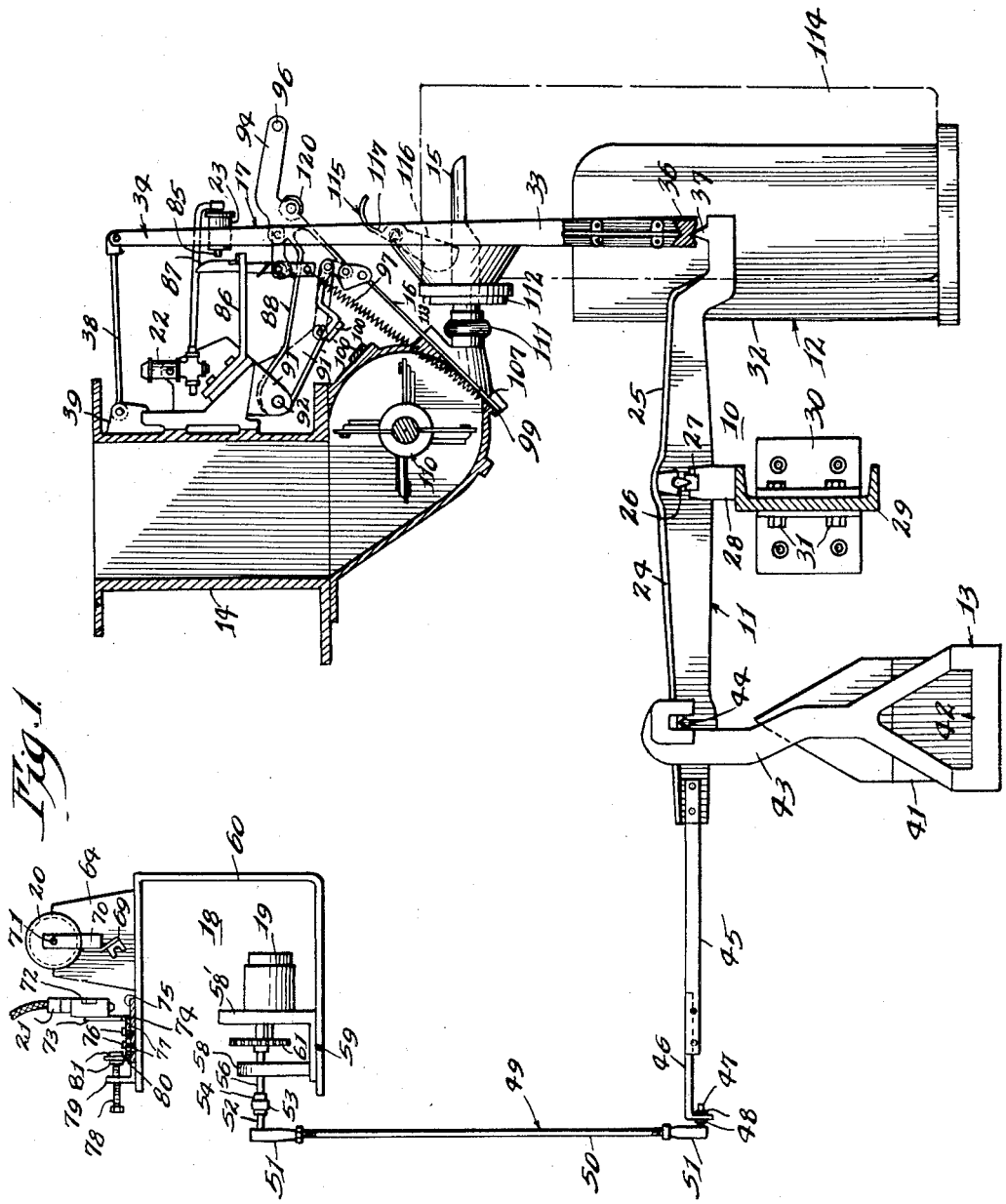
Figure 1 is a side elevational view, partly in section, of a weighing device constructed in accordance with the present invention, portions of the gate triggering mechanism being shown in open position.

The present weighing device includes a scale 10, preferably a balance-type scale, having a balance beam 11, a basket 12 pivotally suspended from one end of the balance beam 11 for supporting a suitable container to be filled with material, and a platform 13 pivotally suspended from the other end of the balance beam for supporting weights of known size for counterbalancing the material which is to be delivered into the container supported within the basket 12. A spring-loaded gate 16 in the lower end of the hopper 14 controls the flow of material from the hopper. A gate latching mechanism 17 is provided which permits the gate 16 to be raised to open position and to be maintained in said open position until a predetermined quantity of material is received by the container. A triggering mechanism 18 which is connected to the balance beam 11 instantaneously releases the latching mechanism 17 when the predetermined quantity of material is received on the basket 12, permitting the spring-loaded gate 16 to snap to closed position. The triggering mechanism includes a first motor 19 which connects with one of the ends of the balance beam 11 in a manner such that the angular position of the shaft of the motor 19 is controlled by the position of the balance beam 11. The motor 19 is inductively related to a second motor 20 in a manner such that the motor shaft of the second motor 20 follows the angular movements of the shaft of the first motor 19. When the shaft of the second motor 20 reaches a predetermined position, it trips a mercury switch 21 which operates a suitable valve 22 which in turn actuates a hydraulic ram 23. The actuation of the hydraulic ram 23 instantaneously releases the latch mechanism 17, permitting the gate 16 to be snapped to closed position, thereby cutting off the delivery of material from the supply hopper 14. This system overcomes the deficiencies which exist in the prior art weighing devices and operates accurately and effectively over long periods of time without the necessity of adjustments or repairs.

More specifically, the balance-type scale 10 of the embodiment illustrated in Figure 1 includes a pair of spaced-apart, rigidly interconnected, longitudinally extending leg members 24 (only one of which is visible in Figure 1) which are symmetrically positioned relative to the longitudinal axis of the balance scale and form the balance beam 11 thereof. The leg members 24 are formed of suitable structural material such as steel or the like and may include flanges 25 which give added rigidity thereto. Each of the leg members 24 has a centrally positioned, knife-edged pivot 26 rigidly or integrally attached thereto. The pivots 26 engage notches in cooperating socket members 27 which are attached to suitable, spaced-apart brackets 28. The brackets 28 are rigidly connected to the upper leg of a rail 29 which is adjustably positioned within brackets 30 by means such as the nuts and bolts 31. The outer ends of the leg members 24 at one end of the balance beam 11 are spaced apart a sufficient distance to accommodate the basket 12 therebetween. The outer face of each of the side walls 32 of the basket 12 is rigidly attached to the lower end of one of the arms 33 of an inverted, generally V-shaped brace member 34. The brace member is strengthened by a transverse or cross member 35 adjacent its upper end. A replaceable, hardened socket member 36 forms the lower portion of each of the arms 33. Upwardly extending knife-edged pivots 37 at the ends of the leg members 24 engage notches in the lower ends of the socket members 36, thereby pivotally supporting the basket 12 at one end of the balance beam 11. The basket 12 is prevented from rocking by a horizontal link 38 which is pivotally connected at one end to a bracket 39 on the hopper and at its other end to ears 40 which extend from the upper end or apex of the brace member 34. The platform 13 for holding counter weights, one of which is indicated at 41, is pivotally suspended from the opposite end of the balance beam 11. The platform 13 includes a lower horizontal surface 42 and a pair of generally upwardly extending, hook-shaped arm members 43, the upper hooked ends of which have notches which engage outwardly extending, knife-edged pivots 44 on the leg members 24.

The end of the balance beam 11 adjacent the platform 13 is connected through interconnected links and gears with the motor 19 which forms a generator or transmitter of a self-synchronous system known commercially as a Selsyn system. This system will be explained in greater detail below.

Figure 4:
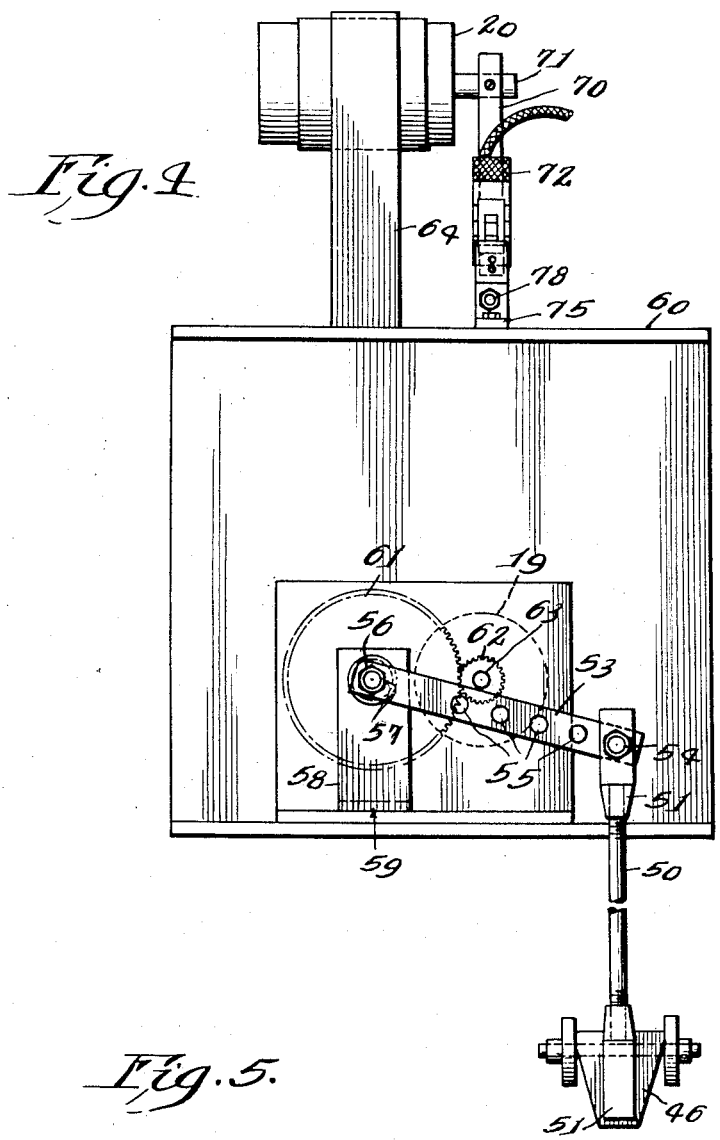
Figure 4 is a rear elevational view of that portion of the weighing device containing the inductively related motors.

As illustrated in Figures 1 and 4, the outer end of each of the leg members 24 of the scale 10, outwardly of the pivots 44, is connected to the inner end of a horizontally extending rigid arm 45. The arms 45 converge toward each other and are connected at their outer ends to the inner end of a generally L-shaped arm or link 46. The arms 45 and 46 together form a rigid extension of the balance beam 11 outwardly of the pivots 44. The outer end of the arm 46 is bent transversely to the axis of the balance beam 11 and is connected with a short, horizontally extending, threaded link 47 through suitable means such as the nuts 48. The outer end of the link 47 is connected to the lower end of a vertically extending, adjustable link 49 by an ordinary ball and socket joint (not shown) formed in the extremities of the links 47 and 49. The link 49 may conveniently include a central rod 50 having oppositely threaded end portions and a pair of end members 51 which are threaded on the rod 50. By rotating the rod 50 relative to the end members 51, one may, within certain limits, shorten or lengthen the overall extension of the link 49. The upper end of the link 49 is connected to a short, horizontally extending, threaded link 52, which is generally similar to the link 47, through a ball and socket joint (not shown). As best seen in Figure 1, the link 52 is connected to a transversely extending arm 53 through nuts 54. The arm 53 is provided with a series of spaced apertures 55 so that the link 52 can be connected at various positions along the arm 53. One of the ends of the arm 53 is connected to the outer end of a partially threaded, longitudinally extending shaft 56, which extends through a suitable aperture in the end of the arm 53 and is connected thereto by nuts 57. The shaft 56 is rotatably supported within suitable bearings (not shown) in the vertically extending, spaced apart arms 58 and 58′ of a bracket 59, which is connected to a suitable frame member 60. A relatively large gear 61 is fixedly attached to the shaft 56 between the arms 58 and 58′ of the bracket 59. The gear 61 meshes with a smaller gear 62 fixed to the shaft of the motor 19, the motor 19 being fixedly attached to the arm 58′ of the bracket 59. The relative sizes of the gears 61 and 62 are chosen so that a predetermined rotation of the arm 53 around the shaft 56 will produce a selected rotation of the shaft 63 of the motor 19.

With the above described connection between the balance beam 11 and the motor 19, a small movement of the balance beam will produce a relatively large angular movement of the motor shaft 63. The relative angular displacement of the motor shaft 63 may be varied, as indicated above, by altering the point of connection between the rod 50 and the arm 53, and/or by changing the relative sizes of the gears 61 and 62. In addition, the position of the motor shaft 63 may be varied slightly, for any given position of the balance beam 11, by rotation of the rod 50 relative to the end members 51 and 51′.

The motor 20 is inductively related to the motor 19 which may be located at any desired distance therefrom. In the embodiment illustrated in Figure 1, the motor 20 is mounted on a bracket 64, which is connected to the frame member 60. The motors 19 and 20 are of the self-synchronous type known generally as Selsyn motors.

Figure 5:
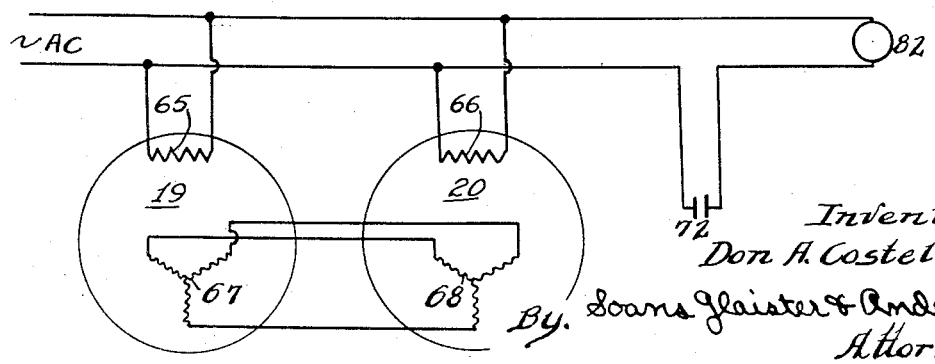
Figure 5 is a circuit diagram illustrating the electrical circuit employed in the weighing device.

As indicated in the wiring diagram of Figure 5, the motors 19 and 20 are similar to three-phase induction motors, but have rotors with definite poles, the windings 65 and 66 of which are connected through collector rings to a single-phase alternating current source of excitation. The stator windings 67 of the transmitter motor 19 are connected to the stator windings 68 of the indicator motor 20 in the manner indicated in this figure. When the rotor excitation circuit is closed, as is normally the case, an alternating current voltage is impressed on the transmitter motor 19 and the indicator motor 20. The single-phase current in the rotors induces voltages in the three legs of each stator which are unequal in magnitude and which vary with the position of the rotors. When the two rotors are in exactly corresponding positions, the voltages induced in the transmitter stator are equal and opposite to those induced in the indicator stator, that is, they are balanced and no current flows in the windings of either stator. If, however, the rotor of the transmitter motor is moved, the induced voltages are no longer equal and opposite, and current will flow in the stator windings 67 and 68, setting up torques in both rotors. Since the rotor of the transmitter motor 19 is held in position and the rotor of the indicator motor 20 is free to turn, the rotor of the indicator motor will be pulled around until it reaches a position in which the stator voltages balance, which position corresponds to the new position of the transmitter motor 19. Thus, as the rotor of the transmitter motor is turned, the rotor of the indicator motor follows at the same speed and in the same direction.

A small permanent magnet 69 is connected to the outer end of an arm 70 which extends radially of and is connected at its inner end to the shaft 71 of the motor 20. As the motor shaft 71 rotates, it will cause the permanent magnet to traverse an arcuate path towards or away from the mercury switch 21. The mercury switch 21 is a commercially available, magnetically actuated type switch. As is well known, this type of switch includes an outer non-magnetic casing (usually glass) which protects the inner mechanism from contamination.

The mercury switch 21 is adjustably position at a point spaced from the motor 20 so that when the motor shaft 71 reaches a given angular position, the magnet 69 will actuate the switch 21. The mercury switch is held in a generally vertical position by a spring clip 72 attached to a vertical arm 73 of a horizontally adjustable bracket 74. The bracket 74 is adjustable along a member 75 on the frame member 60, by screws 76 which extend through slots 77 in the bracket 74 and are threaded into the member 75. An adjusting screw 78 extends through a threaded aperture in a vertically extending arm 79 of the member 75 and is rotatively connected at its outer end with a vertically extending arm 80 of the bracket 74 by means such as the fixed washers or spacers 81 for regulating the position of the bracket 74. The horizontal position of the mercury switch may be changed by loosening the screws 76 and rotating the adjusting screw 78, and the vertical position of the mercury switch 21 may be changed by raising or lowering the switch within the spring clip 72. By means of the above adjustments, the position of the mercury switch 21 can be varied so that the switch may be tripped by the magnet 69 at varying angular positions of the motor shaft 71.

Since it requires very little force to rotate the arm 70 and magnet 69, the torque produced on the rotor of the motor 20 should preferably be less than that which would cause damage to the switch 21 if the arm 70 is rotated sufficiently to bring the magnet into contact with the switch.

When the mercury switch 21 is tripped, it closes the circuit to a solenoid air valve 22 mounted on a bracket 82 which is connected to a casting 83 on the hopper 14, causing the valve to open. As soon as the valve 22 opens, air under pressure from a suitable source (not shown) flows through the solenoid valve 22 and connecting air hose 84 to the hydraulic ram 23 mounted on the cross member 35 between the arms 33 of the brace member 34. As soon as air enters the hydraulic ram 23, it forces a piston 85 outwardly thereof which releases the gate latching mechanism 17. When the magnet moves away from the mercury switch 21, the switch opens, breaking the circuit to the solenoid air valve 22. This causes the solenoid valve to close which releases the air from the hydraulic ram 23, causing the piston 85 to retract.

The gate latching mechanism 17 includes a generally U-shaped latch arm 86, a cooperating latch 87, and a pivoted, spring-biased arm 88.

The latch arm 86 is constructed of steel plate or the like and is sufficiently strong to withstand the weight of the latch 87 and arm 88. The latch arm 86 extends in a generally horizontal direction and is connected at its ends to the casting 83 by bolts 89. A hardened steel block 90 is welded to the center of the latch arm 86 at the point where it engages the lacth 87, thereby eliminating the wearing away of the central portion of the latch arm 86 which would otherwise occur upon the operation of the latch mechanism.

The arm 88 is pivotally connected at its inner end between vertically extending ears 91 and 91' on the lower end of the casting 83 by a pin 92. The arm 88 may be formed of any suitable structural material, for example, cast iron, which is not likely to be deformed by continual use. If desired, the arm 88 may include reinforcing flanges 93. The arm 88 is irregularly shaped, as illustrated in Figures 1, 2 and 3, and includes a bifurcated handle portion 94 which rotatably supports a hand grip 95 at its outer end, the hand grip being journalled on a pin 96 which extends between the sides of the handle portion 94. The arm 88 is biased in a downward direction by a pair of coil springs 97 which are attached to the ends of a pin 98 extending through the central portion of the arm 88 and to pins 99 on the lower end of the hopper 14. Hardened steel blocks 100 and 100' are welded to the arm 88 and to the hopper 14 respectively, at the point where the arm contacts the hopper to prevent excessive wear at this point.

The latch 87 is fabricated of sheet steel or the like into the shape illustrated in Figures 1 and 2. The latch 87 is journalled at its lower end on a pin 101 which extends between a pair of angular castings 102 which are rigidly connected at their outer ends to the pivoted arm 88. The latch 87 is biased in an outward direction by a spring 103 which extends around portions of the castings 102 and latch 87. The latch 87 extends vertically a sufficient distance so that the outwardly facing surface thereof is always in contact with the latch arm 86. The outwardly facing surface of the latch 87 is suitably recessed to permit the latch 87 to engage the upper surface of the hardened block 90 when the arm 88 is raised. A hardened steel block 105 is integrally secured to the latch 87 at the point where the latch engages the hardened steel block 90 to prevent the wearing away of this portion of the latch. It should be noted that the ram 23 is positioned appropriately so that its piston 85 may strike the upper end of the latch to disengage the latch 87 from the latch arm 86.

The lower end of the pivoted arm 88 is connected to the upper end of the gate 16 through a pair of pivoted links 106 and 106' for controlling the position of the gate 16 in the lower end of the hopper 14. The gate 16 is rectangularly shaped and slides within suitable slots or guideways 107 in the lower end of the hopper 14 within the discharge opening 108 thereof. In order to maintain the gate 16 parallel to the slots 107, a link 109 is provided which is pivoted at one end to the end of the ear 91' and at the other end to the upper end of the link 106'. When the pivoted arm 88 is in raised position with the latch 87 interengaged with the latch arm 86, the gate 16 is drawn upwardly a sufficient amount to completely open the discharge opening 108, thereby letting material flow out of the hopper 14. To assist in this delivery of material from the hopper 14, agitating means such as rotatable paddles 110 may be provided within the lower end of the hopper 14. The agitating means may be operated by suitable means such as an electric motor (not shown).

An elongated delivery nozzle 15 is connected to the lower delivery end of the hopper 14 through a short length of flexible tubing 111 so that the discharge opening 108 is connected into the passageway in the delivery nozzle 15. In order to prevent the delivery nozzle 15 from becoming disengaged from the hopper 14 as material passes therethrough, the delivery nozzle is provided with a flange 112 which is attached to a casting 113 welded between the arms 33 of the brace member 34. The casting 113 is suitably shaped to permit the delivery nozzle 15 to be inserted within a suitable entrance opening in a bag 114 or other container to be filled with material from the hopper 14.

A suitable bag holding mechanism 115 may be provided for maintaining a bag 114 in proper position during the filling operation. The bag 114 may be fabricated of any suitable material such as paper, cloth, or the like, and dimensioned so as to seat within the basket 12 with its entrance opening at the same height as the delivery nozzle 15. The bag holding mechanism 114 includes a pair of spaced holding arms 116 which are connected at their upper ends to the lower end of a central upwardly extending curved plate 117. The holding mechanism 115 is pivotally supported intermediately thereof on a pin 118 journalled in the casting 113. The holding mechanism is biased so as to maintain the arms 116 in engagement with the delivery nozzle by a spring 119. A cooperating roller 120 on the pivoted arm 88 is positioned to strike the upper surface of the curved plate 117 when the arm 88 moves downwardly, thereby pivoting the holding arms against the biasing action of the spring 119 which raises the arms from engagement with the sides of the bag 114.

The above described weighing device is operated in the following manner:

Counterbalancing weights 41 equal to the weight of material to be delivered per batch are placed on the lower horizontal surface 42 of the platform 13. With the pivoted arm 88 in a lowered position, i.e., with the hardened block 100 engaging the hardened block 100', a bag 114 of suitable size is placed within the basket 12 with its mouth or entrance opening inserted over the nozzle 15. It is assumed that the hopper 14 has been previously filled with a supply of material to be weighed. The pivoted arm 88 is now manually moved upwardly by means of the hand grip 95. This will cause the forward face of the latch 87 to slide along the front portion of the latch arm 86 until the recessed portion of the latch is reached, whereupon the hardened block 105 on the latch will engage the hardened block 90 on the latch arm and maintain the pivoted arm 88 in its raised position. As the pivoted arm 88 moves upwardly, it releases the bag holding mechanism 115, the arms 116 of which then move downwardly to lock the bag 114 against the delivery nozzle 15. The gate 16 which is pivotally connected to the pivoted arm 88 is moved to open position when the pivoted arm is raised, thereby permitting material to flow from the hopper 14. As soon as a sufficient amount of material flows into the bag to overcome the counterbalancing weights 41, the balance beam 11 will rock on the pivots 26. The movement of the balance beam will operate the triggering mechanism 18 which instantaneously releases the latch 87 from the latch arm 86, whereupon the pivoted arm 88 will snap to closed position, closing the gate 16 and stopping the flow of material to the bag 114 and releasing the bag holding mechanism 115. The filled bag may then be removed from the basket 12.

The triggering machanism 18 may be adjusted as explained above, by varying the link and gear connection between the balance beam 11 and the motor 19; by varying the length of the link 49; or by adjusting the position of the mercury switch relative to the position of the permanent magnet 69.

Various changes and modifications can be made in the above structure without departing from the scope of the present invention as defined by the following claims.

I claim:

1. A weighing device for measuring a predetermined quantity of flowable material comprising a hopper for containing a supply of flowable material, a discharge conduit in the lower end of said hopper, a gate for controlling the flow of material from said hopper, a scale having a vertically movable material receiving section in position to receive material discharged from said hopper, a transmitter motor, means mechanically connecting said transmitter motor to said scale in a manner such that the angular position of the rotor of said transmitter motor is a function of the vertical position of the material receiving section of said scale, an indicator motor, electrical means connecting said transmitter motor to said indicator motor, said transmitter motor being inductively related to said indicator motor in a manner such that the angular rotation of the rotor of the transmitter motor is reproduced in the rotor of the indicator motor, a switch actuated by said indicator motor when its rotor reaches a predetermined position, a latch connected to said gate, said latch movable into one position for closing said gate and being movable into another position for opening said gate, means biasing said latch to its position for closing said gate, a fixed latch arm positioned so as to releasably engage said latch when said latch is moved to its position for opening said gate, and means actuated by said switch for releasing said latch from engagement with said latch arm to permit said biasing means to move said latch to its position for closing said gate.

2. A weighing device for measuring a predetermined quantity of flowable material comprising a hopper for containing a supply of said flowable material, a discharge conduit in the lower end of said hopper, a gate for controlling the flow of material from said hopper, a scale having a vertically movable material receiving section in position to receive material discharged from said hopper, a transmitter motor, means mechanically connecting said transmitter motor to said scale in a manner such that the angular position of the rotor of said transmitter motor is a function of the vertical position of the material receiving section of said scale, said mechanical means being adjustable for varying the extent of the angular rotation of the rotor of the transmitter motor for a predetermined vertical movement of said material receiving section of said scale, an indicator motor, electrical means connecting said transmitter motor to said indicator motor, said transmitter motor being inductively related to said indicator motor in a manner such that the angular rotation of the rotor of the transmitter motor is reproduced in the rotor of the indicator motor, a switch actuated by said indicator motor when its rotor reaches a predetermined position, said switch being movable relative to said indicator motor for varying the position at which the rotor of said indicator motor actuates said switch, a latch connected to said gate, said latch movable into one position for closing said gate and being movable into another position for opening said gate, means biasing said latch to its position for closing said gate, a fixed latch arm positioned so as to releasably engage said latch when said latch is moved to its position for opening said gate, and means actuated by said switch for releasing said latch from engagement with said latch arm to permit said biasing means to move said latch to its position for closing said gate.

3. A weighing device for measuring a predetermined quantity of flowable material comprising a hopper for containing a supply of said flowable material, a discharge conduit in the lower end of said hopper, a gate for controlling the flow of material from said hopper, a scale having a vertically movable material receiving section in position to receive material discharged from said hopper, a transmitter motor, means mechanically connecting said transmitter motor to said scale in a manner such that the angular position of the rotor of said transmitter motor is a function of the vertical position of the material receiving section of said scale, an indicator motor, electrical means connecting said transmitter motor to said indicator motor, said transmitter motor being inductively related to said indicator motor in a manner such that the angular rotation of the rotor of the transmitter motor is reproduced in the rotor of the indicator motor, a switch actuated by said indicator motor when its rotor reaches a predetermined position, an arm pivoted at one end thereof, link means connecting said pivoted arm with said gate for moving said gate to open and closed positions respectively as the free end of said pivoted arm is moved, means biasing the free end of said pivoted arm in one direction for normally maintaining said gate in closed position, a latch pivotally connected at one end to said pivoted arm, said latch having a recessed section on a face thereof, a fixed latch arm positioned so as to releasably engage the recessed portion of said latch when the free end of said pivoted arm is moved for maintaining said gate in open position, and means actuated by said switch for releasing said latch from said latch arm thereby permitting said biasing means to move said pivoted arm to close said gate.

4. A weighing device for measuring a predetermined quantity of flowable material comprising a hopper for containing a supply of said flowable material, a discharge conduit in the lower end of said hopper, a gate for controlling the flow of material from said hopper, a scale having a vertically movable material receiving section in position to receive material discharged from said hopper, a transmitter motor, means mechanically connecting said transmitter motor to said scale in a manner such that the angular position of the rotor of said transmitter motor is a function of the vertical position of the material receiving section of said scale, said mechanical means being adjustable for varying the extent of the angular rotation of the rotor of the transmitter motor for a predetermined vertical movement of said material receiving section of said scale, an indicator motor electrically connected to said transmitter motor, said transmitter motor being inductively related to said indicator motor in a manner such that the angular rotation of the rotor of the transmitter motor is reproduced in the rotor of the indicator motor, a mercury switch, a magnet connected to the rotor of said indicator motor for actuating said switch when the rotor of said indicator motor reaches a predetermined position, said mercury switch being movable relative to said indicator motor for varying the position at which the rotor of said indicator motor actuates said switch, an arm pivoted at one end thereof, link means connecting said pivoted arm with said gate for moving said gate to open and closed positions respectively as the free end of said pivoted arm is moved, means biasing the free end of said pivoted arm in one direction for normally maintaining said gate in closed position, a latch pivotally connected at one end to said pivoted arm, said latch having a recessed section on a face thereof, a fixed latch arm positioned so as to releasably engage the recessed portion of said latch when the free end of said pivoted arm is moved for maintaining said gate in open position, and a hydraulic ram actuated by said mercury switch for releasing said latch from said latch arm thereby permitting said biasing means to move said pivoted arm to close said gate.

References Cited in the file of this patent

UNITED STATES PATENTS

| | | |
|---|---|---|
| Re. 17,816 | Hartman | Sept. 30, 1930 |
| 1,818,095 | Peterson | Aug. 11, 1931 |
| 1,964,935 | Dorrington | July 3, 1934 |
| 2,011,608 | Belknap | Aug. 20, 1935 |
| 2,208,284 | Weckerly | July 16, 1940 |
| 2,581,205 | Reilly | Jan. 1, 1952 |
| 2,634,080 | Knobel | Apr. 7, 1953 |
| 2,634,081 | Knobel | Apr. 7, 1953 |
| 2,770,439 | Stafford et al. | Nov. 13, 1956 |